United States Patent
Held

(10) Patent No.: US 10,648,792 B2
(45) Date of Patent: May 12, 2020

(54) MEASURING SYSTEM AND MEASURING METHOD

(71) Applicant: CARL ZEISS INDUSTRIELLE MESSTECHNIK GMBH, Oberkochen (DE)

(72) Inventor: Tobias Held, Noerdlingen (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 91 days.

(21) Appl. No.: 15/713,787

(22) Filed: Sep. 25, 2017

(65) Prior Publication Data
US 2018/0094913 A1 Apr. 5, 2018

(30) Foreign Application Priority Data

Sep. 30, 2016 (DE) .................. 10 2016 118 620

(51) Int. Cl.
*G01B 5/016* (2006.01)
*G06T 7/73* (2017.01)
(Continued)

(52) U.S. Cl.
CPC ............ *G01B 11/007* (2013.01); *G01B 5/016* (2013.01); *G01B 11/002* (2013.01);
(Continued)

(58) Field of Classification Search
CPC .... G01B 11/007; G01B 11/002; G01B 5/016; G01B 21/042; G01B 11/005; G01B 5/008; G06T 7/73; G06T 2207/30204
See application file for complete search history.

(56) References Cited

U.S. PATENT DOCUMENTS 5,724,745 A 3/1998 Brenner et al.
6,973,734 B2 12/2005 Raab et al.
(Continued)

FOREIGN PATENT DOCUMENTS

CN 1839293 A 9/2006
CN 101023322 A 8/2007
(Continued)

OTHER PUBLICATIONS

GOM—Optical Measuring Techniques, Application Example: 3D Motion Analysis, 2009, pp. 1-7 (Year: 2009).*
(Continued)

*Primary Examiner* — Toan M Le
(74) *Attorney, Agent, or Firm* — Harness, Dickey & Pierce, P.L.C.

(57) ABSTRACT

A measuring system having a measuring tool which includes a probe body and an optical marker, a camera for recording image data of the measuring tool, and an evaluation and control unit which is configured to evaluate the image data recorded by the camera and use the data to determine spatial position coordinates of the optical marker. The evaluation and control unit is also configured to calculate the deformation of the measuring tool due to external mechanical loading acting on the measuring tool, and to determine spatial position coordinates of the probe body based on the spatial position coordinates of the optical marker and the calculated deformation.

15 Claims, 4 Drawing Sheets

(51) Int. Cl.
  *G01B 11/00* (2006.01)
  *G01B 21/04* (2006.01)
(52) U.S. Cl.
  CPC .............. *G01B 21/042* (2013.01); *G06T 7/73* (2017.01); *G06T 2207/30204* (2013.01)

(56) References Cited

U.S. PATENT DOCUMENTS

| | | | |
|---|---|---|---|
| 6,988,322 | B2 | 1/2006 | Raab et al. |
| 8,983,795 | B2 | 3/2015 | Lotze et al. |
| 9,557,159 | B2 | 1/2017 | Ikebuchi |
| 9,671,257 | B2 | 6/2017 | Held et al. |
| 2003/0063292 | A1 | 4/2003 | Mostafavi |
| 2003/0229279 | A1* | 12/2003 | Amstutz ................ A61B 17/16 600/424 |

FOREIGN PATENT DOCUMENTS

| | | |
|---|---|---|
| DE | 26 05 772 A1 | 8/1977 |
| DE | 102 58 579 A1 | 7/2004 |
| DE | 10 2008 049 751 A1 | 4/2010 |
| DE | 100 66 470 B4 | 9/2011 |
| DE | 10 2015 205 615 A1 | 10/2015 |
| EP | 0 703 517 B1 | 3/2000 |
| EP | 1 984 695 B1 | 10/2008 |
| EP | 2 172 735 B1 | 4/2010 |
| WO | 93/07443 | 4/1993 |
| WO | 2006/114627 A1 | 11/2006 |
| WO | 2013/007285 A1 | 1/2013 |

OTHER PUBLICATIONS

Camera Calibration and 3D Reconstruction; http://docs.opencv.org/2.4/modules/calib3d/doc/camera_calibration_and_3d_reconstruction.html, Aug. 3, 2017.
OptiTrace http://optinav.pl/en/info/products/optitrace.html, Dec. 22, 2017.
Von Werner Lotze; Messende Taster mit mehreren Freiheitsgraden (English language translation included); 1992; 7 pp.
Dietmar Gross et al.; Technische Mechanik, Band 1: Statik; 8., erweiterte Auflage (English translation included); Springer, 2004—5 pp.
Chinese Examination Report (English translation included) for Appl'n. No. 201710902871.6, dated May 8, 2019; 16 pp.

* cited by examiner

MEASURING SYSTEM AND MEASURING METHOD

CROSS-REFERENCE TO RELATED APPLICATION

This application claims Convention priority of German patent application 10 2016 118 620.1, filed on Sep. 30, 2016. The entire content of this priority application is incorporated herein by reference.

BACKGROUND OF THE INVENTION

The present disclosure relates to a measuring system having a measuring tool which comprises a probe body and an optical marker, having a camera for recording image data of the measuring tool, and having an evaluation and control unit which is configured to evaluate the image data recorded by the camera and to use said data to determine spatial position coordinates of the optical marker.

The present disclosure further relates to a corresponding measuring method as well as to a computer program product, which comprises a program code that is configured to perform the method when it is run on a computer for controlling the aforementioned measuring system.

An exemplary measuring system of the above-mentioned general type is known from DE 10 2015 205 615 A1.

Measuring systems of this type serve to check workpieces, for example within the scope of quality assurance, or ascertain the geometry of a workpiece completely within the scope of what is known as "reverse engineering". Moreover, diverse further application possibilities are conceivable, such as e.g. process-controlling applications, in which the measurement technique is applied directly for the online monitoring and control of manufacturing and processing processes. A common application example is that of checking vehicle body components in respect of possible manufacturing faults. In principle, however, such measuring systems can be used to measure any type of measurement objects.

Measuring systems having handheld measuring tools are used as an alternative to more complicated coordinate measuring machines in which the workpieces are measured either optically and/or in a tactile manner on a stationary or permanently installed machine with a relatively complex structure.

Due to the mobile usability, measuring systems having handheld measuring tools are becoming increasingly important because they have the potential to extend the range of uses yet further in comparison with stationary or permanently installed coordinate measuring machines solely due to their flexible usability. However, the extremely stringent requirements for the measurement accuracy that these measuring systems are intended to deliver often count against the usability of such a mobile measuring system. It is true that manifold digital-optical possibilities now exist, in particular software methods, in order that, from images or films of objects or scenes, the spatial structure of the imaged objects in the scene may be deduced. In principle, these methods have some shortcomings, however, which result in them currently not yet being suitable for many highly precise measurements but only being used for measurements which have lower requirements for the measurement accuracy.

In the measuring system known from DE 10 2015 205 615 A1, a tactile probe head, which can be used to manually scan a workpiece to be measured, is arranged on a manually portable measuring tool. Furthermore, a plurality of optical markers are arranged on a handle of the measuring tool and regularly emit infrared beams which are captured from the outside using a camera system. The camera images recorded by the camera system are evaluated in a computing unit, the position and orientation of the markers in space being calculated by means of a suitable computing algorithm. This is usually carried out using optical triangulation methods. The location and position of the probe head and of the probe body relative to the markers can be determined by means of a calibration step. If a user guides the measuring tool towards a workpiece with his hand, with the result that the probe body touches the workpiece, a measuring point on the workpiece can therefore be determined. The shape and location of the workpiece relative to the camera system ultimately result from a suitable multiplicity of such measuring points.

However, the measuring system known from DE 10 2015 205 615 A1 has at least two important disadvantages. On the one hand, active infrared light sources are used as markers. Such active markers which are integrated in the handheld measuring tool have the disadvantage that, due to the development of heat caused by them, they give rise to material expansions which may result in measurement errors. Such measurement errors cannot be disregarded at all in optical measurement technology. On the other hand, in the system known from DE 10 2015 205 615 A1, the user must manually actuate a button on an actuation unit in order to signal to the computing unit that a measuring point is intended to be captured or in order to store a currently captured measuring point. Since the user inevitably exerts a force for this purpose, the magnitude and direction of which are unknown, the probe head can be readily deformed, shaken or shifted. Further deformations may occur due to the force of the weight acting on the measuring tool or due to forces of inertia or forces of contact that act on the probe body. This results in measurement errors that cannot be readily compensated.

Similar problems also arise in a system sold by Optinav under the name "OptiTrace" (http://optinay.pl/en/info/products/optitrace.html, retrieved on 22 Dec. 2015).

In stationary or permanently installed coordinate measuring machines, the aforementioned problems are often solved by means of additional sensors that are integrated in the probe head of the coordinate measuring machine. An example of such a measuring system is known from WO 2006/114627 A1. In this case, the probe body or the measuring tip is coupled to the quill of the coordinate measuring machine via springs of the probe head. The movement of the probe head relative to the quill is determined using a separate measuring system. Such probe heads are also referred to as passively measuring sensors for coordinate measuring machines. Another example of a similar system is known from WO 2013/007285 A1.

A similar measuring probe having a load sensor, which is integrated therein, measures the force acting between the probe body and the workpiece and controls the measurement recording based on the signal generated by the load sensor, is known from EP 1 984 695 B1. Although such sensors could also be used in handheld measuring systems, this would considerably increase the overall complexity of the measuring system. In particular, as a result of the additional sensors, further active components would be accommodated in the measuring system, with the result that temporal synchronization of the sensor signals with the signals from the optical tracking system would be required.

Another example of a handheld coordinate measuring machine is known from EP 0 703 517 B1. Apart from the relatively high degree of complexity of this system, the mobile usability is restricted here by the fact that the probe head is connected to a fixed column via a movably mounted carrier.

EP 2 172 735 B1, DE 10 2008 049 751 A1 and DE 100 66 470 B4 also discloses a number of methods for use in stationary or permanently installed coordinate measuring machines in which it is attempted by suitable calibration to compensate for the deflection of the probe body of the coordinate measuring machine that is brought about by the force of the weight, the measuring force or other external forces with the aid of a corresponding control or adjustment of the position of the probe body. However, in the existing form, these methods are only known and suitable for stationary or permanently installed coordinate measuring machines. Corresponding solutions for handheld measuring systems so far do not exist.

SUMMARY OF THE INVENTION

It is an object to provide an optical measuring system of the type mentioned above which, in contrast to the aforementioned handheld measuring systems from the prior art, has a simpler structure, manages as far as possible without active components in the measuring tool and can be used to achieve a higher degree of measurement accuracy.

According to an aspect of the present disclosure, a measuring system is presented, which comprises (i) a measuring tool which comprises a probe body and an optical marker, (ii) a camera for recording image data of the measuring tool, and (iii) an evaluation and control unit, which is configured to evaluate the image data captured by the camera and to determine spatial position coordinates of the optical marker based on the image data. The evaluation and control unit is further configured to calculate a deformation of the measuring tool due to external mechanical loading acting on the measuring tool, and to determine spatial position coordinates of the probe body based on the spatial position coordinates of the optical marker and the calculated deformation.

According to another aspect of the present disclosure, a measuring method is presented, which comprises the following steps:
  recording image data of a measuring tool, which has a probe body and an optical marker;
  evaluating the recorded image data;
  determining spatial position coordinates of the optical marker based on the evaluated image data;
  calculating a deformation of the measuring tool due to external mechanical loading acting on the measuring tool; and
  determining spatial position coordinates of the probe body based on the spatial position coordinates of the optical marker and the calculated deformation.

The aforementioned object is also achieved by a computer program product, which comprises a program code that is configured to perform said method when it is run on a computer for controlling the measuring system.

Exemplary embodiments and configurations that are mentioned below and/or defined in the claims relate not only to the measuring system but in an equivalent way also to the measuring method and the computer program product.

With the measuring system according to the present disclosure the deformation of the measuring tool that is caused by external loading can be corrected. The correction is performed in a computational manner within the evaluation and control unit. Due to the computational correction, additional components are not absolutely necessary for the measuring system.

It should be pointed out that the measuring tool that is used in the measuring system can not only be manually guided but also be clamped in a machine, for example a robot. For example, the measuring system can also be used in workpiece processing machines, wherein the measuring tool is clamped in a corresponding clamping apparatus of the machine.

Irrespective of the type of use of the measuring system, the evaluation respectively takes place in principle as follows: The camera of the measuring system, which may in principle be in the form of an individual camera but preferably comprises a plurality of cameras, is configured to record an image or image sequence containing the measuring tool and its optical marker. To be able to ensure an image evaluation, at least the optical marker should be in the image. The measuring tool itself does not necessarily have to be completely in the image. The evaluation and control unit is configured to evaluate the image data recorded by the camera and to use said data to determine with the aid of the optical marker position data of the marker which contain the spatial position coordinates of the optical marker, preferably in the form of three-dimensional coordinates. Based on these position coordinates of the optical market that are determined by the optical evaluation, ultimately the position coordinates of the probe body can be determined. For the force-free state, the position and location of the probe body in relation to the optical marker can be determined, for example in a calibrating step in advance. The probe body and the optical marker are preferably connected to one another via a rigid body. If the position and location of the optical marker are known, the position of the probe body of the measuring tool can therefore also be calculated therefrom, at least for the force-free state of the measuring tool. The deformation of the measuring tool occurring due to the external mechanical loading acting on the measuring tool can be included in this calculation by simple superpositioning, so that the force-free position of the probe body is correspondingly corrected by the position-changing components that occur due to the said deformation.

For measuring the external mechanical loading acting on the measuring tool, the measuring system preferably comprises a force measuring device. This force measuring device may be configured in various ways. According to a refinement, the force measuring device comprises a force sensor that is integrated in the measuring tool or arranged on it. Such a force measuring sensor may for example be configured capacitively or with the aid of a strain gauge, these being just two examples among many.

In an alternative refinement, the camera and the evaluation and control unit are part of the force measuring device, wherein the evaluation and control unit is configured to calculate the external mechanical loading acting on the measuring tool based on the image data recorded by the camera. To be able to ensure such an optical calculation of the force, the measuring tool should be configured correspondingly. In a parallel patent application of the same applicant that was filed on the same date as this patent application, such a measuring tool with the aid of which the measuring force acting on the measuring tool during a measurement can be calculated is described. This is so because in it the measuring tool consists of two different parts, which are configured as rigid bodies and are connected to another via a spring element. An optical marker is arranged on both parts, so that the relative displacement of the two parts that is caused by the measuring force can be determined by way of the evaluation of the image data recorded by the camera. The measuring force can be determined from the relative displacement of the two parts of the measuring tool if the elastic properties (stiffness properties) of the spring element are known.

There are in practice many further possibilities for being able to determine the external forces acting on the measuring tool during a measurement. Therefore, the scope of the present disclosure is not intended to be restricted to the previously mentioned examples of force measurement.

According to a refinement, the evaluation and control unit is configured to calculate the deformation of the measuring tool based on a simplified mechanical substitute model, in which the measuring tool is modelled as a mechanical system which comprises at least two rigid bodies and a first elastic node that connects the two rigid bodies to one another.

In the mechanical substitute model, preferably the optical marker is modelled as part of the first rigid body and the probe body is modelled as part of the second rigid body. Therefore, the elastic node is preferably locationally arranged in the mechanical substitute model between the probe body and the optical marker. To minimize the complexity of the mechanical substitute model, the two rigid bodies can be modelled for example as bodies that are essentially in the form of bars or beams.

According to a refinement, the deformation is modelled in the mechanical substitute model as a translation and/or rotation of the two rigid bodies in relation to one another and can be calculated by means of the equation $\vec{u}=N*\underline{b}$, where $\vec{u}$ describes the deformation and $\vec{b}$ describes the external mechanical loading, in each case in a vectorial form, and N is a compliance matrix, which describes compliance properties of the elastic node as a result of the external mechanical loading.

This mechanical substitute model was developed by Prof. Werner Lotze and is known for example from the publication with the title "Messende Taster mit mehreren Freiheitsgraden" [Measuring probes with multiple degrees of freedom] by Werner Lotze, TR Technische Rundschau, issue 29/30, 1993, pp. 20-25. Similar models are also used in the methods known from DE 100 66 470 B4 and EP 2 172 735 B1.

The mechanical substitute model is based on a strict linearity between the external loading and the deformation of the measuring tool. The relationship between the deformation vector $\vec{u}$ and the loading vector $\vec{b}$ is expressed by the compliance matrix N. According to this substitute model, the external loading $\vec{b}$ is reduced to the force vector $\vec{f}$ and the moment vector $\vec{m}$ at the centre of the elastic node. The deformation vector $\vec{u}$ usually consists of a translation vector $\vec{v}_0$ and a rotation vector $\vec{\delta}$ and is expressed by the following basic equation.

$$\vec{u} = \begin{pmatrix} \vec{v}_0 \\ \vec{\delta} \end{pmatrix} = N * \vec{b} = \begin{pmatrix} N_{11} & N_{12} \\ N_{21} & N_{22} \end{pmatrix} * \begin{pmatrix} \vec{f} \\ \vec{m} \end{pmatrix},$$

where $\vec{v}_0$ and $\vec{\delta}$ are defined as follows:

$$\vec{v}_0 = \begin{pmatrix} v_{0x} \\ v_{0y} \\ v_{0z} \end{pmatrix}$$

$$\vec{\delta} = \begin{pmatrix} \delta_{rx} \\ \delta_{ry} \\ \delta_{rz} \end{pmatrix}$$

The compliance matrix N contains as a hypermatrix the compliance matrices $N_{11}, \ldots, N_{22}$, the meaning of which is evident from the extensive form of the following equation:

$$\vec{v}_0 = N_{11}*\vec{f} + N_{12}*\vec{m}$$

$$\vec{\delta} = N_{21}*\vec{f} + N_{22}*\vec{m}$$

In this equation, the submatrices $N_{ij}$ have the following meaning:

$N_{11}$ translation as a result of the force vector $\vec{f}$;

$N_{12}$ translation as a result of the effective moment vector $\vec{m}$;

$N_{21}$ rotation as a result of the force vector $\vec{f}$; and $N_{22}$ rotation as a result of the effective moment vector $\vec{m}$.

Altogether, the deformation in the mechanical substitute model is therefore consequently described as proportional to the forces and moments acting at the centre. The superposition principle applies. In the general case, the deformation vector $\vec{u}$ consists of translation and rotation components. Depending on simplification, however, the rotation components $\vec{\delta}$ or the translation components $\vec{v}_0$ may be omitted. Generally, the translation and the rotation are respectively described on the one hand as a result of the forces acting and on the other hand as a result of the moments acting.

The aforementioned model can be used relatively well for solving the present problem of calculating the deformation due to external loading on the measuring tool. Due to the relatively low complexity of the mechanical substitute model, the complexity of the computation remains reasonable.

When the aforementioned mechanical substitute model is used, the spatial position coordinates of the probe body are preferably calculated by means of the following equation:

$$\vec{p} = \vec{p}_s + M_s * (\vec{p_{N1}} + f(\vec{u}, \vec{t_{N1}}));$$

$$\text{with } \vec{u} = \begin{pmatrix} v_{0x} \\ v_{0y} \\ v_{0z} \\ \delta_{rx} \\ \delta_{ry} \\ \delta_{rz} \end{pmatrix}; \text{ and}$$

$$f(\vec{u}, \vec{t_{N1}}) = R_z(\delta_{rz}) * R_y(\delta_{ry}) * R_x(\delta_{rx}) * \vec{t_{N1}} + \begin{pmatrix} v_{0x} \\ v_{0y} \\ v_{0z} \end{pmatrix};$$

where $\vec{p}$ describes the spatial position coordinates of the probe body and $\vec{p}_s$ describes the spatial position coordinates of the optical marker, in each case in a vectorial form in a fixed inertial system, where $M_s$ is a transformation matrix for the transformation of vectors from a body-fixed coordinate system which is fixed with respect to the measuring tool into the fixed inertial system, where $\vec{p}_{N1}$ describes spatial position coordinates of the elastic node in a vectorial form in the body-fixed coordinate system, where $\vec{t}_{N1}$ describes a vector of the elastic node in relation to the probe body in the body-fixed coordinate system, where $v_{0x}, v_{0y}, v_{0z}$ are translation components of the deformation vector $\vec{u}$ and $\delta_{rx}, \delta_{ry}, \delta_{rz}$ are rotation components of the deformation vector $\vec{u}$, and where $R_x, R_y, R_z$ describe rotation matrices in relation to the rotation of the rotation components $\delta_{rx}, \delta_{ry}, \delta_{rz}$ in Euclidean space.

In the case of the last-mentioned refinement, the origin of the fixed inertial system is preferably chosen at the centre of the optical system of the camera, or in the case of two cameras midway between the two cameras. As explained in more detail further below, the origin of the body-fixed coordinate system that is moved along with the measuring tool can be chosen for example at the centre of the optical marker.

The translation and rotation components $v_{0x}, v_{0y}, v_{0z}, \delta_{rx}, \delta_{ry}, \delta_{rz}$ respectively describe the translation and rotation components along the three orthogonal principal axes of the body-fixed coordinate system. The rotation matrices $R_x, R_y, R_z$ are usually defined as follows:

$$R_x(\delta_{rx}) = \begin{pmatrix} 1 & 0 & 0 \\ 0 & \cos(\delta_{rx}) & -\sin(\delta_{rx}) \\ 0 & \sin(\delta_{rx}) & \cos(\delta_{rx}) \end{pmatrix}$$

$$R_y(\delta_{ry}) = \begin{pmatrix} \cos(\delta_{ry}) & 0 & \sin(\delta_{ry}) \\ 0 & 1 & 0 \\ -\sin(\delta_{ry}) & 0 & \cos(\delta_{ry}) \end{pmatrix}$$

$$R_z(\delta_{rz}) = \begin{pmatrix} \cos(\delta_{rz}) & -\sin(\delta_{rz}) & 0 \\ \sin(\delta_{rz}) & \cos(\delta_{rz}) & 0 \\ 0 & 0 & 1 \end{pmatrix}$$

The aforementioned rotation matrices $R_x, R_y, R_z$ can also be defined as projection matrices, as are usually used in American speaking parts of the world. However, the result remains the same. It is similarly possible to define these as a 4×4 matrix, or else to simplify them. By assuming small angles, which is entirely appropriate for the present case, the individual cosine components in the aforementioned matrices can be substituted by 1 and the sine components can be substituted by the respective angle $\delta_r$.

The external mechanical loading acting on the measuring tool that the evaluation and control unit takes into account for the calculation of the deformation of the measuring tool according to the aforementioned mechanical substitute model preferably comprises the force of weight acting on the measuring tool, a force of inertia acting on the measuring tool and/or a contact force acting on the probe body, which occurs for example in the case of a measuring operation in which the probe body is pressed onto a measurement object.

Depending on the degree of the desired accuracy, one or more of the aforementioned forces may be disregarded. The external forces to be taken into account can be superposed on one another according to the superposition principle. The force of the weight can be determined in advance, at least in terms of the absolute value, by prior measurement, for example by weighing or with the aid of FEM methods. As already mentioned above, the contact force acting on the probe body during a measurement can be determined with the aid of a corresponding force measuring device. The acceleration for the determination of the force of inertia (F=m*a) can likewise be determined based on a special sensor, for example based on an acceleration sensor that is integrated in the measuring tool. Alternatively, the acceleration may also be calculated from the optical tracking system. For this purpose, each individual component is calculated or measured with the mass of the centre of gravity that is to be taken into account and is stored in the body-fixed coordinate system of the measuring tool. The position of these centres of gravity can be calculated with $\vec{p}_s$ and $M_s$. The acceleration of the individual component is then obtained with good approximation from the second derivative of the position thus calculated over time.

According to a further refinement, the optical marker comprises at least three optical marker elements arranged in a distributed manner on the measuring tool.

Although one marker element is sufficient in principle, the position and location can be determined even more easily using three marker elements arranged in a distributed manner than using only one optical marker element. The individual marker elements can therefore also be comparatively simpler.

According to a further refinement, the marker elements are passive optical marker elements which in the undeformed state of the measuring tool are arranged in a common plane.

This has the advantage that passive marker elements do not give rise to any heat input into the measuring tool that could have a negative effect on the measurement accuracy. Moreover, this also has advantages with respect to the production costs of the measuring tool in comparison with active marker elements.

The elastic node that is used in the aforementioned, simplified mechanical substitute model is preferably arranged at the most yielding or most elastic point of the measuring tool. Depending on the desired accuracy, it is also possible for more than one elastic node to be modelled in the mechanical substitute model mentioned. Along with increasing the accuracy, this only increases the complexity of the computation, but does nothing to change the basic calculation of the deformation or the basic calculation of the ultimate spatial position coordinates of the probe body.

According to a further refinement, the measuring tool is modelled in the mechanical substitute model as a mechanical system which comprises a first, a second and a third rigid body and also a first and a second elastic node, wherein the first elastic node connects the first rigid body and the second rigid body to one another and the second elastic node connects the second rigid body and the third rigid body to one another, and wherein a first of the three optical marker elements is modelled as part of the first rigid body, a second of the three optical marker elements is modelled as part of the second rigid body and the probe body is modelled as part of the third rigid body.

This has the advantage that it is also possible to compensate for a deformation of the measuring tool within the region of the marker. This allows a further increase in the measuring accuracy.

Depending on the application, the probe body may be configured as a probe sphere or probe tip. When the measuring system is used within a machine tool, the probe body may for example also be configured as a tool head.

The abovementioned features and those yet to be explained below can be used not only in the combination specified in each case but also in other combinations or on their own, without departing from the scope of the present disclosure.

BRIEF DESCRIPTION OF THE DRAWINGS

Exemplary embodiments are illustrated in the drawings and explained in more detail in the following description. In the figures.

DESCRIPTION OF PREFERRED EMBODIMENTS

Figure 1:
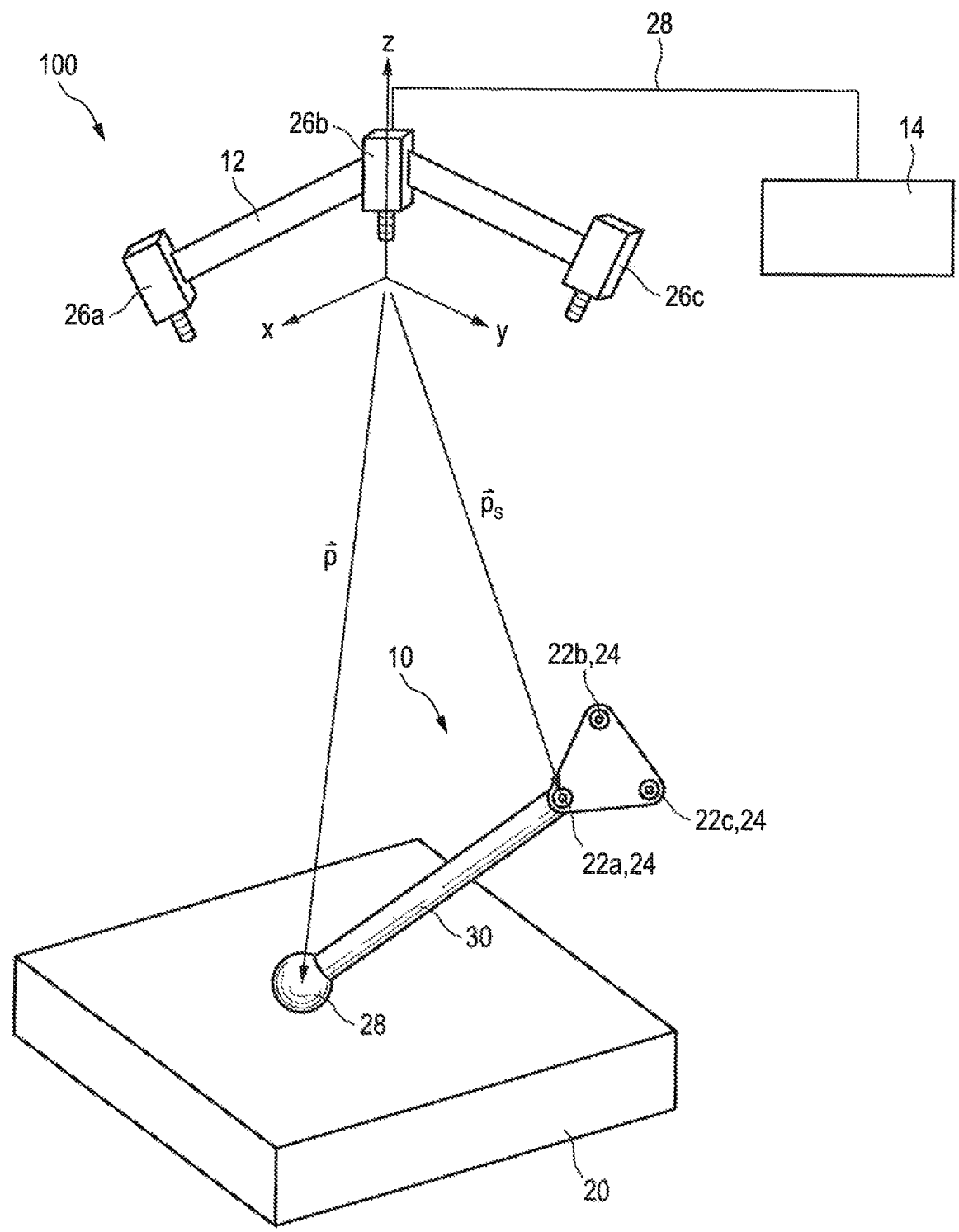
FIG. 1 shows a simplified schematic representation of an exemplary embodiment of the measuring system.

FIG. 1 shows a simplified representation of an exemplary embodiment of the measuring system. The measuring system is designated as a whole by the reference numeral 100 therein. Part of the measuring system 100 is a measuring tool which is designated by the reference numeral 10.

In addition to the measuring tool 10, the measuring system comprises a camera system 12 and also an evaluation and control unit 14.

The measuring tool 10 is used to scan a workpiece 20 in a tactile manner. This scanning can be carried out manually, that is to say in a handheld manner, or automatically with the aid of a suitable machine, e.g. a robot. During scanning of the workpiece 20, the position of the measuring tool 10 is captured with the aid of the tracking system consisting of the camera system 12 and the evaluation and control unit 14. The position is preferably captured continuously or at a scanning frequency, which is preferably 200 Hz or greater. The position is captured based on the camera images recorded by the camera system 12 inside the evaluation and control unit 14 with the aid of known evaluation algorithms in which triangulation methods are conventionally used. In the present case, the detection of the measuring tool 10 inside the camera images is simplified by means of a plurality of optical marker elements 22a-22c which are mounted on the measuring tool 10 for the purpose of identifying it and for determining its position and location. In the present case, the marker elements 22a-22c are referred to overall as optical marker 24.

In the present exemplary embodiment, the camera system 12 is a system consisting of three cameras 26a-26c. In principle, however, a single camera would also suffice to carry out the method described here. More than three cameras may also be used.

The evaluation and control unit 14 is preferably a computing unit, for example a computer, on which corresponding software is installed, which can be used to evaluate the images provided by the camera system 12 accordingly in order to be able to determine the position of the measuring tool 10 as coordinates in an arbitrary fixed coordinate system.

As shown in FIG. 1, the connection 28 between the camera system 12 and the evaluation and control unit 14 can be effected via a corresponding cable. Alternatively, however, the camera system 12 can also be connected to the evaluation and control unit 14 via a wireless connection. It would similarly be possible to accommodate the camera system 12 and the evaluation and control unit 14 in a common housing by implementing the evaluation and control unit 14 in the form of a processor chip. Furthermore, a screen and a corresponding input unit (e.g. a keyboard) may belong to the measuring system 100 in order to be able to graphically display the measurement results and input control commands accordingly.

In addition to the optical marker 24 (marker elements 22a-22c), the measuring tool 10 comprises a probe body 28, which in the present exemplary embodiment is in the form of a probe sphere. However, the probe body 28 need not absolutely necessarily be spherical. Depending on the measuring task, the probe body 28 may for example also be in the form of a measuring tip.

The probe body 28 is connected to the optical marker 24 via a rigid body 30. In the present case, the rigid body 30 is substantially rod-shaped. The marker elements 22a-22c are arranged in the region of a first end of the rigid body 30. The probe body 28 is arranged at the opposite, second end of the rigid body 30. However, the rigid body 30 is used not only as a rigid connection between the optical marker 24 and the probe body 28 but also as a handle by which the user can manually hold the measuring tool 10. In principle, this handle can also be clamped in a machine. In principle, it is likewise conceivable for different types of probe bodies 28 to be connected to the rigid body 30 via a corresponding adapter and connecting mechanism.

The marker elements 22a-22c of the optical marker 24 are shown in FIG. 1 in a simplified form as circular elements. However, this is merely one example of the configuration of the marker elements 22a-22c. In principle, they may have any desired shapes that can be clearly identified as markers with the aid of the camera system 12. However, they are preferably passive marker elements.

The position and location of the region of the rigid body 30 on which the marker elements 22a-22c of the optical marker 24 are arranged can be determined with the aid of the optical marker 24 based on the camera images. If the position and location of the optical marker 24 are known, the position and location of the probe body 28 are therefore also known with the aid of suitable previously performed calibration of the measuring tool 10. This position and location of the probe body 28 is preferably expressed with the aid of spatial position coordinates, the location preferably being expressed with the aid of a 3×3 matrix that describes the orientation of the measuring tool 10 in space.

The position coordinates are preferably expressed in a fixed coordinate system, the origin of which lies at the centre of the camera system 12. In FIG. 1, the position of the marker 24 or the position of the first marker element 22a is indicated with the aid of a vector $\vec{p}_s$ and the position of the probe body 28 is indicated with the aid of a vector $\vec{p}$.

Figure 2:
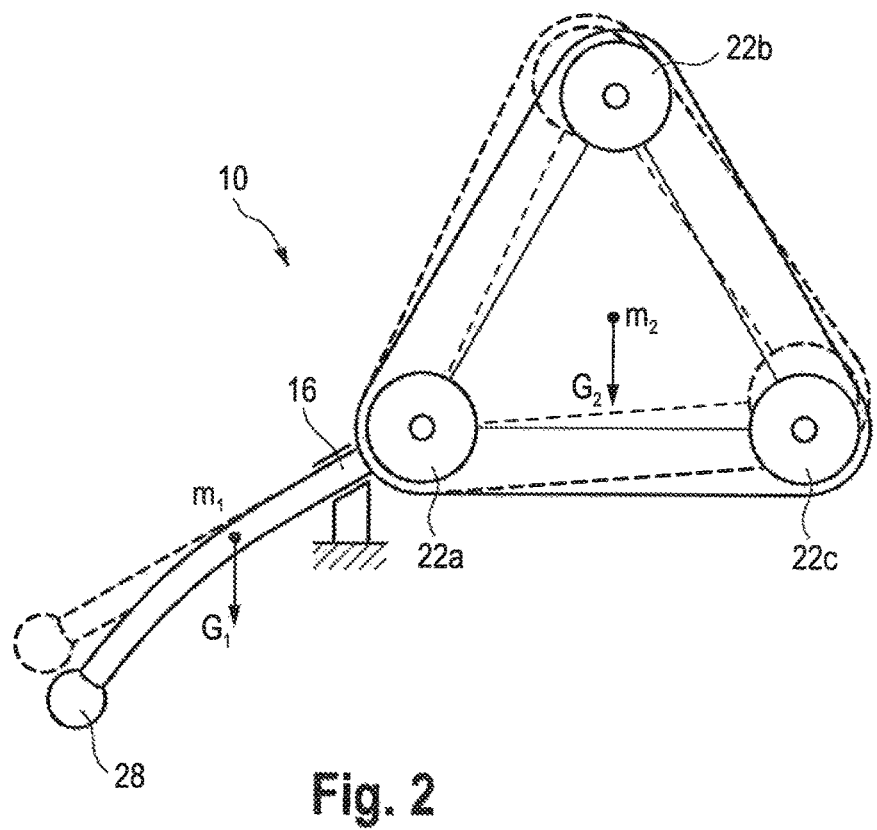
FIG. 2 shows a schematic representation for illustrating a deformation of a measuring tool belonging to the measuring system due to the force of the weight acting on it.

The accuracy of a measuring system 100 such as that shown in FIG. 1 is adversely affected inter alia by the elastic deformation of the measuring tool 10, which is caused by external mechanical loading of the measuring tool 10. FIG. 2 shows purely schematically a possible deformation of the measuring tool 10 due to the force of the weight G. In the situation shown in FIG. 2, the measuring tool 10 is manually secured for example at the point indicated by the reference numeral 16. Since in practice the measuring tool 10 is not a rigid body that is ideal from a mechanical viewpoint, the measuring tool 10 bends somewhat due to this loading. This deformation is exaggerated in FIG. 2.

Apart from the force of the weight G, for example the forces that the user causes by holding the measuring tool 10 usually act on the measuring tool 10 to produce the external mechanical loading. Furthermore, forces of inertia occur during the movement of the measuring tool 10. Not forgetting the scanning force, which usually occurs during a measuring operation in which the measuring tool 10 is pressed with its probe body 28 onto the workpiece 10 to be measured. If the probe body 28 is configured as a tool head, a corresponding contact force such as can be caused for example by a tool on a robot should be taken into account.

The herein presented solution comprises a model with the aid of which a deformation of the measuring tool 10 caused by such mechanical loadings can be compensated or corrected in such a measuring system 100. This correction is performed in a computational manner within the evaluation and control unit 14. The evaluation and control unit 14 is configured to calculate the deformation of the measuring tool 10 due to external mechanical loading acting on the measuring tool 10, and to determine spatial position coordinates of the probe body 28 based on the spatial position coordinates of the marker 24 and the calculated deformation.

In other words, and taking into consideration the vectors depicted in FIG. 1, this means the following: The aim of the evaluation carried out by the evaluation and control unit 14 is to determine the vector $\vec{p}$, that is to say the coordinates of the probe body 28 in the fixed coordinate system, to be precise while taking into account the deformation of the measuring tool 10. For this purpose, first the position coordinates of the marker 10 are determined. The position coordinates of the marker 24 or of the first marker element 22a are shown in FIG. 1 with the aid of the vector $\vec{p}_s$. Furthermore, the deformation of the measuring tool 10 is calculated, so that, based on the deformation of the measuring tool 10 and the vector c, the vector $\vec{p}$ can be calculated.

Figure 3:
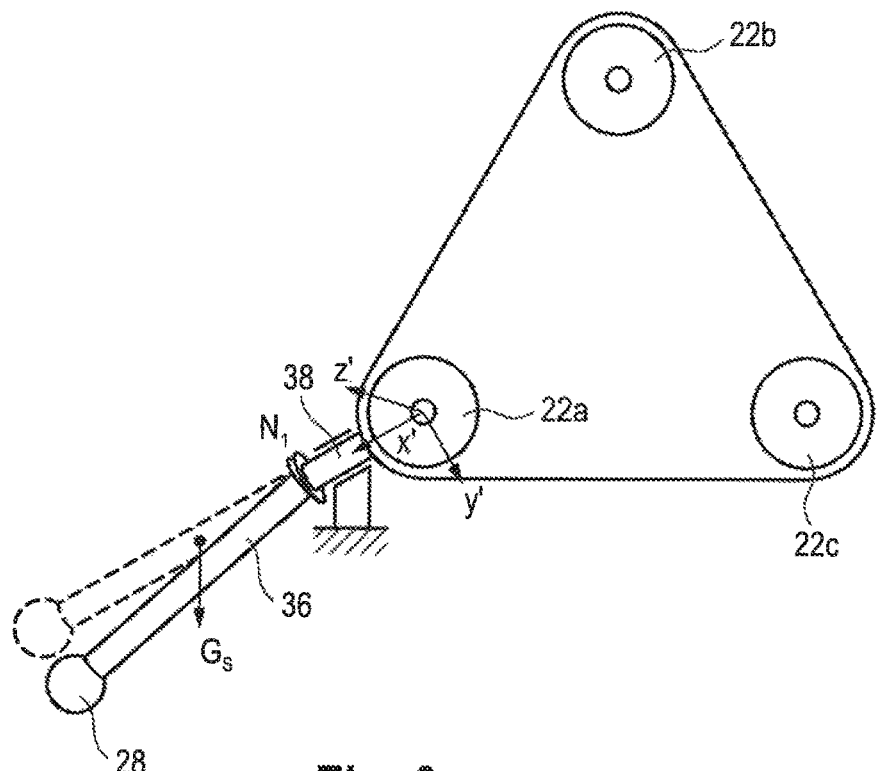
FIG. 3 shows a schematic representation for illustrating a simplified mechanical substitute model with the aid of which the measuring tool belonging to the measuring system is modelled.

In detail, the calculation of the vector $\vec{p}$ may be performed as follows: According to an exemplary embodiment, the deformation of the measuring tool 10 is calculated based on a simplified mechanical substitute model in which the measuring tool is modelled as a mechanical system which consists of at least two rigid bodies and an elastic node located between them that connects the at least two rigid bodies to one another. FIG. 3 shows such a mechanical substitute model for the measuring tool 10 in a schematic form.

In the example shown in FIG. 3, the measuring tool 10 is modelled as a body consisting of two rigid individual bodies 36, 38, wherein the two rigid individual bodies 36, 38 in the model are connected via an elastic node N1. According to this model, the individual bodies 36, 38 behave as ideal rigid bodies. On the other hand, the elastic node allows a movement of the two rigid bodies 36, 38 in relation to one another. According to the model known from Prof. Werner Lotze, this movement is described as a superposed translational and rotational relative movement of the two bodies 36, 38 (see "Messende Taster mit mehreren Freiheitsgraden" by Werner Lotze, TR Technische Rundschau, issue 29/30, 1993, pp. 20-25 and DE 100 66 470 B4).

FIG. 3 shows the simplest case of such a mechanical substitute model, using only one elastic node N1, which connects two rigid bodies 36, 38 to one another. To increase the accuracy of the calculation presented in the present case, a plurality of such elastic nodes can be included in the model, in order to model the measuring tool 10 not only as consisting of two rigid bodies but also of a plurality of rigid bodies. If, for example, the connections between the individual marker elements 22a, 22b, 22c should be configured with differing stiffness, and therefore a displacement and/or tilting of the individual marker elements 22a-22d must be taken into account, further elastic nodes, which are arranged between the marker elements 22a-22c, may be provided in the mechanical substitute model. For example, for each of the three marker elements 22a-22c, an own centre of gravity, an own weight and an own compliance of the respective elastic node may be included in the model. For purposes of simplification, further explanation is based however on the model with only one elastic node N1 that is shown in FIG. 3.

As already mentioned, the mechanical substitute model that is used in this exemplary embodiment is based on a deformation of the elastic node N1 that is strictly linear and dependent on the external loading. This deformation is proportional to the forces and moments effective at the elastic node N1. The superposition principle applies. The external loading $\vec{b}$ is reduced to the force vector $\vec{f}$ and the moment vector $\vec{m}$ that are effective at the elastic node N1. The deformation vector $\vec{u}$ consists of a translation vector $\vec{v}_0$ which contains the translation components $v_{0x}$, $v_{0y}$, $v_{0z}$ and a rotation vector $\delta$, which contains the rotation components $\delta_{rx}$, $\delta_{ry}$, $\delta_{rz}$. For the deformation vector $\vec{u}$, the following applies:

$$\vec{u} = N * \vec{b} = \begin{pmatrix} N_{11} & N_{12} \\ N_{21} & N_{22} \end{pmatrix} * \begin{pmatrix} \vec{f} \\ \vec{m} \end{pmatrix} \tag{1}$$

In equation 1, N denotes a compliance matrix, which describes the compliance properties of the elastic node N1. This compliance matrix N contains as a hypermatrix the compliance matrices $N_{11}, \ldots, N_{22}$, where $N_{11}$ describes the translation of the elastic node as a result of the force vector f, $N_{12}$ describes the translation as a result of the moment vector m effective at the elastic node, $N_{21}$ describes the rotation as a result of the force vector f effective at the elastic node, and $N_{22}$ describes the rotation as a result of the moment vector m effective at the elastic node. The translational deformation of the elastic node N1 is consequently obtained as $$\vec{v}_0 = N_{11} * \vec{f} + N_{12} * \vec{m} \tag{2}$$

The rotational deformation of the elastic node $N_1$ is consequently obtained as $$\vec{\delta} = N_{21} * \vec{f} + N_{22} * \vec{m} \tag{3}$$

The vector $\vec{p}$ (see FIG. 1) can consequently be calculated with the aid of this mechanical substitute model by the following formula:

$$\vec{p} = \vec{p}_s + M_s * (\vec{p_{N1}} + f(\vec{u}, \vec{t_{N1}})); \tag{4}$$

$$\text{with } \vec{u} = \begin{pmatrix} v_{0x} \\ v_{0y} \\ v_{0z} \\ \delta_{rx} \\ \delta_{ry} \\ \delta_{rz} \end{pmatrix}; \tag{5}$$

$$f(\vec{u}, \vec{t_{N1}}) = R_z(\delta_{rz}) * R_y(\delta_{ry}) * R_x(\delta_{rx}) * \vec{t_{N1}} + \begin{pmatrix} v_{0x} \\ v_{0y} \\ v_{0z} \end{pmatrix} \tag{6}$$

where $\vec{p}$ describes the spatial position coordinates of the probe body 28 and $\vec{p}_s$ describes the spatial position coordinates of the optical marker 24 or 22a, in each case in a vectorial form in the fixed inertial system (see FIG. 1), and where $M_s$ is a transformation matrix that is used for the transformation of the remaining vectors in the aforementioned equation from a coordinate system fixed on the body in relation to the measuring tool 10 into the fixed inertial system. This is so because the remaining components of the aforementioned equation are preferably expressed in a fixed coordinate system x', y', z', which is preferably placed at the centre of the first marker element 22a. $\vec{p}_{N1}$ concerns the spatial position coordinates of the elastic node in a vectorial form in the body-fixed coordinate system x', y', z'. $\vec{t}_{N1}$ concerns a vector of the elastic node $N_1$ in relation to the probe body 28 in said body-fixed coordinate system.

Figure 4:
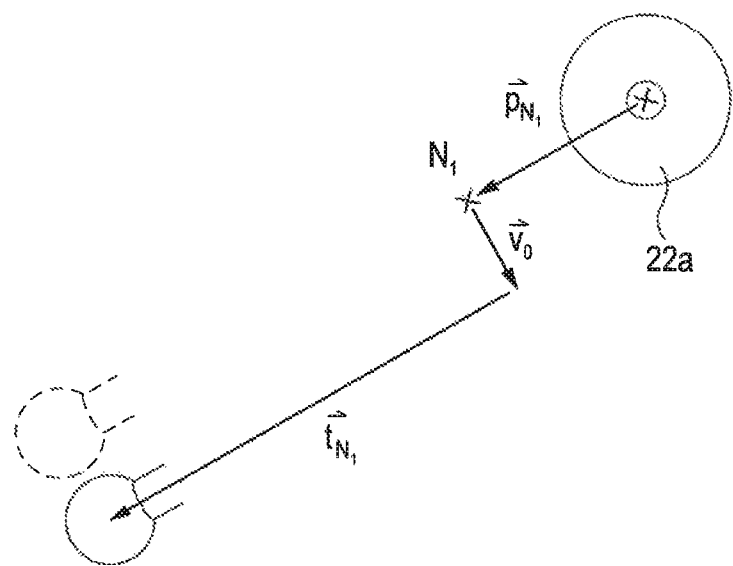
FIG. 4 shows a basic representation of a first part of the loading acting on the measuring tool and also the resultant deformation assumed according to the mechanical substitute model.
Figure 5:
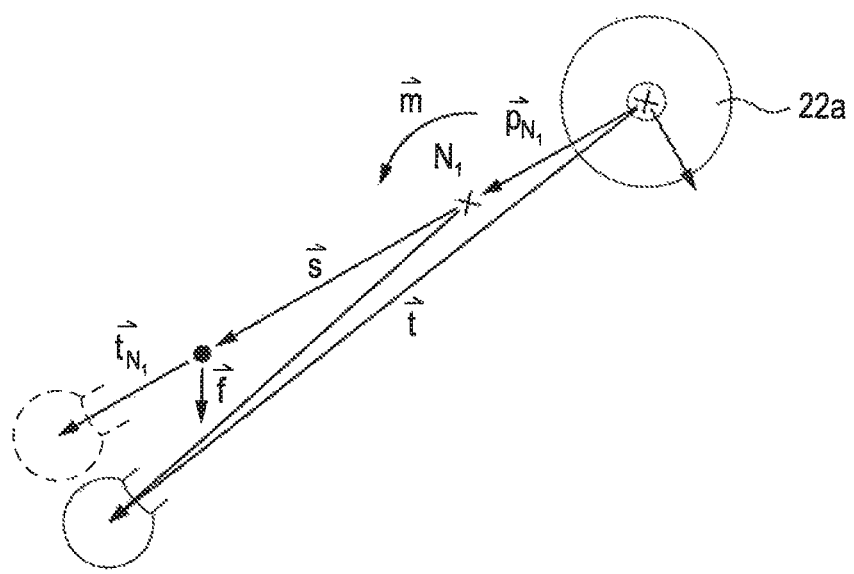
FIG. 5 shows a basic representation of a second part of the loading acting on the measuring tool and also the resultant deformation assumed according to the mechanical substitute model.

The individual components of equations (4) to (6) are once again represented individually in FIGS. 4 and 5 for purposes of illustration, where FIG. 4 shows the deformation in the form of the translational displacement $\vec{v}_0$ and FIG. 5 illustrates the rotational tilting $\vec{\delta}$, which in the model presented here are superposed on one another according to the superposition principle. As already mentioned, N1 indicates the location of the elastic node. This is preferably determined empirically from an FEM calculation or a calibrating calculation. $\vec{p}_{N1}$ indicates the vector of the centre point of the body-fixed coordinate system in relation to the elastic node N1. GS indicates the force of the weight of the tool as a vector with three components. This vector GS is preferably likewise expressed in the body-fixed coordinate system x', y', z'. It is obtained for example from an FEM calculation, by weighing or by user input. As already mentioned, MS is the transformation matrix for transformation from the body-fixed coordinate system x', y', z' into the fixed inertial system x, y, z. This is obtained by the evaluation of the optical tracking system consisting of the marker 24, the camera 12 and the evaluation and control unit 14. $\vec{p}_s$ (see FIG. 1) indicates the position of the optical marker 24 or of the first marker element 22a in the inertial system. This vector is also obtained by evaluation of the optical tracking system. $\vec{t}$ (see FIG. 5) indicates the vector of the body-fixed coordinate system x', y', z' in relation to the centre point of the probe body 28.

This vector t is the result of the present corrective calculation due to deformation of the measuring tool 10. $\vec{t}_{N1}$ indicates the vector of the elastic node N1 in relation to the point of the probe body 28. This is also expressed in the body-fixed coordinate system x', y', z'. This is obtained by a calibrating calculation, which is presented in detail below. $\vec{s}$ indicates the centre-of-gravity vector in relation to the elastic node N1, likewise expressed in the body-fixed coordinate system x', y', z'. The position of the centre of gravity is preferably ascertained with the aid of an FEM model. As an alternative to this, the position of the centre of gravity may be measured with the aid of a rocker. $\vec{f}$ indicates the force vector in the body-fixed coordinate system x', y', z'. An example of this force vector $\vec{f}$ is the force of the weight GS expressed vectorially. $\vec{v}_0$ indicates the translational displacement as a result of the external loading of the measuring tool 10 (see FIG. 4). $\vec{\delta}$ indicates the rotational tilting as a result of the external loading of the measuring tool 10 (see FIG. 5).

The components $R_x$, $R_y$, $R_z$ used in the aforementioned equation 6 are rotation matrices for the rotation of the rotation components $\delta_{rx}$, $\delta_{ry}$, $\delta_{rz}$ in the Euclidean space. These can be expressed for example as follows:

$$R_x(\delta_{rx}) = \begin{pmatrix} 1 & 0 & 0 \\ 0 & \cos(\delta_{rx}) & -\sin(\delta_{rx}) \\ 0 & \sin(\delta_{rx}) & \cos(\delta_{rx}) \end{pmatrix} \tag{7}$$

$$R_y(\delta_{ry}) = \begin{pmatrix} \cos(\delta_{ry}) & 0 & \sin(\delta_{ry}) \\ 0 & 1 & 0 \\ -\sin(\delta_{ry}) & 0 & \cos(\delta_{ry}) \end{pmatrix} \tag{8}$$

$$R_z(\delta_{rz}) = \begin{pmatrix} \cos(\delta_{rz}) & -\sin(\delta_{rz}) & 0 \\ \sin(\delta_{rz}) & \cos(\delta_{rz}) & 0 \\ 0 & 0 & 1 \end{pmatrix} \tag{9}$$

These rotational matrices may also be mathematically expressed differently, which is often the case in particular in American speaking parts of the world. Similarly, as mentioned at the beginning, they can be simplified for small angles.

For the aforementioned correction calculation, therefore, either the compliance matrix N must be expressed in the coordinates of the inertial system x, y, z or the force vector $\vec{f}$ must be transformed into the body-fixed coordinate system x', y', z'. As an example, for purposes of simplification, only the gravitational force G is considered. The gravitational vector $\vec{g}'$ in coordinates of the body-fixed coordinate system x', y', z' and the mass $m_s = |G_s|$ therefore give the force vector $\vec{f}$ in the body-fixed coordinate system x', y', z':

$$\vec{f} = m * \vec{g}' \tag{10}$$

The moment vector $\vec{m}$ is obtained from the cross product of the centre-of-gravity vector $\vec{s}$ and the force vector $\vec{f}$:

$$\vec{m} = \vec{s} \times \vec{f} \tag{11}$$

For this case, the loading vector $\vec{u}$ can therefore be expressed as follows:

$$\vec{u} = \begin{pmatrix} \vec{v_0} \\ \vec{\delta} \end{pmatrix} = N * \begin{pmatrix} \vec{f} \\ \vec{m} \end{pmatrix} = N * \begin{pmatrix} \vec{f} \\ \vec{s} \times \vec{f} \end{pmatrix} \quad (12)$$

Further simplifications of the aforementioned equations can be made by implementing the following ideas. If the construction so allows, it is possible to dispense with most of the degrees of freedom. In the aforementioned model, the deformation can for example be reduced merely to a displacement by the force transversely in relation to the measuring tool 10. This would give the following compliance matrix N:

$$N = \begin{bmatrix} \frac{\delta t_x}{\delta f_x} & 0 & 0 & 0 & 0 & 0 \\ 0 & \frac{\delta t_y}{\delta f_y} & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{bmatrix} \quad (13)$$

where $t_x$, $t_y$ are the translations in the in x and y directions and $f_x$, $f_y$ the force components in the x and y directions, respectively. The two remaining components of the compliance matrix N can be simplified further if the compliance of the measuring tool 10 is assumed to be symmetrical. This would mean that the two remaining components of N are equal.

A further simplification can be performed by setting the location of the compliance node N1 to the origin of the body-fixed coordinate system x', y', z'. This makes the vector $\vec{p}_{N1}$ become zero. The aforementioned equation (4) for the vector $\vec{p}$ could then be simplified to the following relationship:

$$\vec{p} = \vec{p}_s + M_s * (\vec{t}_{N1} + \vec{v_0}) \quad (14)$$

For a more realistic calculation, however, the dynamic load and the measuring force may also be taken into account in addition to the force of the weight. The dynamic load (F=m·a) can be superposed on the force of the weight. In the calculation of the total moment about the elastic node N1, the location where the force acts must be known in each case. For the measuring force, or if instead of the probe body 28 a tool head is used in the case of a tool, this is the centre point of the probe body 28. It is also possible to calculate the acceleration a directly with the gravitational vector g. For the correction of the deformation due to the measuring force, the tilting by a moment can be taken into account for example. In the case of simple probe bodies 28, which are configured for example as a probe sphere, the calculation of the displacement by a force is also possible. If, however, only the tilting by a moment is taken into account, in the compliance matrix N the corresponding coefficients must be set in the submatrix N22. These can be obtained from laboratory measurements, an FEM calculation or an individual calibrating measurement on the measuring tool 10. The aforementioned calculation (12) would consequently allow itself to be reduced to the following simplified equation:

$$\vec{\delta} = N_{22} * \vec{m} = N_{22} * (\vec{t}_{N1} \times \vec{f}) \quad (15)$$

In the explanations so far, the displacement vectors $\vec{v_0}$ and the tilting vectors $\vec{\delta}$ have been described as vectors with three components and the rotation matrices Rx,y,z as 3×3 matrices. It should however be pointed out that the aforementioned formulas can also be expressed with homogeneous 4×4 matrices.

It should likewise be pointed out that, in the above considerations, it has always been assumed that the optical marker 24 is arranged on the measuring tool 10 and the camera or the camera system 12 records it from outside. It would however also be possible in principle to provide one or more cameras on the measuring tool 10 and to provide the optical marker 24 separately therefrom in space, so that the positions of the marker and the camera would, as it were, be changed over. However, the measuring principle would remain the same.

It should incidentally also be mentioned that the probe body 28 can not only operate in a tactile manner, but alternatively also in a contactless manner. The probe body 28 may for example also be configured as an optical or capacitive sensor. For example, the probe body 28 may be formed as a laser scanner which is suitable for measuring the workpiece optically. As an alternative to this, the probe body 28 may also have one or more cameras. These examples are also intended to be covered by the term "probe body" that is used generally here. Also in the case of the aforementioned examples, the determination of the position and location of the probe body 28 is performed in the manner described here.

Figure 6:
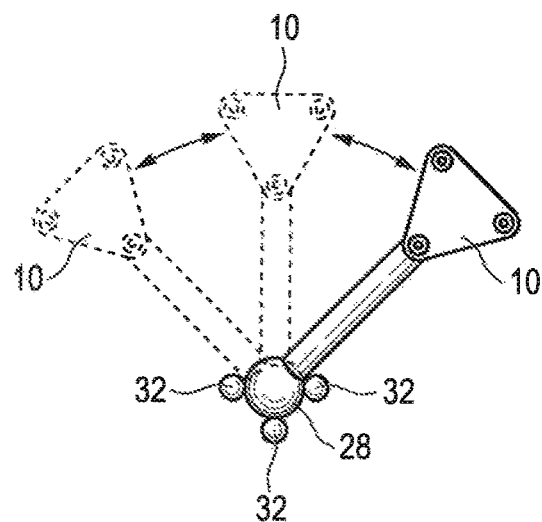
FIG. 6 shows a simplified schematic representation for illustrating a first exemplary calibrating operation.
Figure 7:
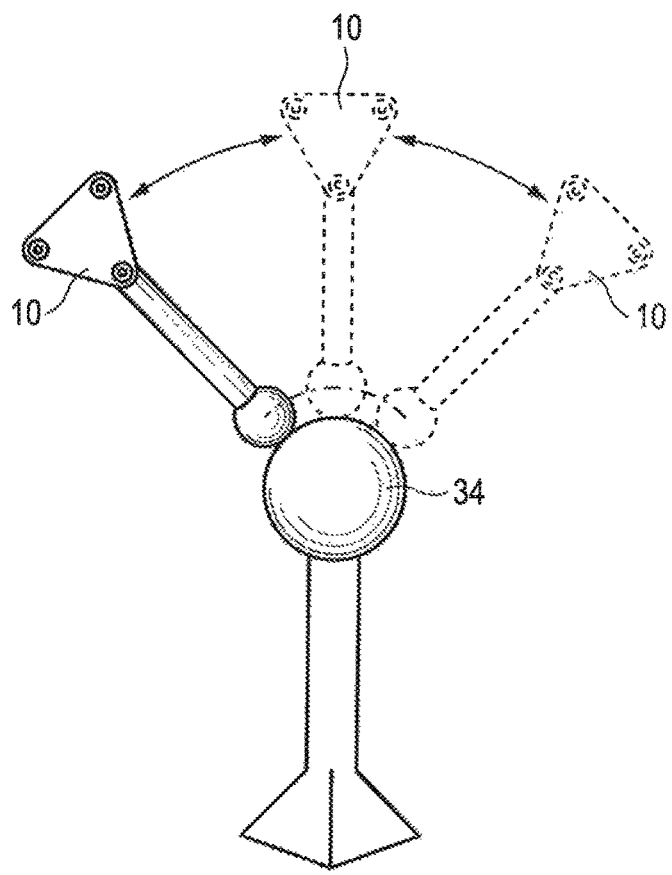
FIG. 7 shows a simplified schematic representation for illustrating a second exemplary calibrating operation.

Finally, two variants given by way of example of the calibration of the measuring tool 10 are to be explained based on FIGS. 6 and 7. According to the calibration variant shown in FIG. 6, a so-called sphere triplet is used. During the calibration, the likewise spherical probe body 28 is brought into contact with the three test spheres 32 of the sphere triplet and is then moved back and forth. During this movement, the position of the marker elements 22a-22c of the optical marker 24 is determined with the aid of the camera system 12 and the evaluation and control unit 14. The position coordinates can be vectorially expressed for example using three translational and three rotational components. Alternatively, as already mentioned, the position coordinates can also be expressed as a 4×4 transformation matrix with a 3×3 orthogonal and orthonormal rotation submatrix or as a position vector and a 3×3 rotation matrix.

According to the above model, the position vector $\vec{p}$ can again be expressed as follows:

$$\vec{p} = \vec{p}_s + M_s * \vec{t} \quad (16)$$

where the components are the same as already explained above. By contrast with the equation explained above, here the vector of the body-fixed coordinate system x', y', z' in relation to the centre point of the probe body 28 is merely combined with the vector t and not expressed in its individual components.

Since, by contrast with the rest of the measuring tool 10, the position of the probe body 28 is not moved during the calibration schematically indicated in FIG. 6 based on the sphere triplet 32, the position vector $\vec{p}$ of the probe body 28 is constant. The unknown t can therefore be solved based on the aforementioned equation with the aid of a plurality of test measurements during the calibration. Since the position vector $\vec{p}$ of the probe body 28, which does not change during calibration, is also initially unknown, this must also be determined. If, however, the deformation of the measuring tool 10 due to external loading is additionally taken into account according to the aforementioned model, the far more complex relationship as in the above equations (4) to (6) is obtained for $\vec{p}$.

However, this relationship can in turn be simplified for example by only a displacement by a force being taken into account. The components of the submatrix $N_{11}$ of the compliance matrix N are expediently calculated during the calibrating calculation at the same time as the probe vector $\vec{t}$ and the probe radius. It has been found that an enforced symmetrization (symmetrical 3×3 matrix), that is to say a calculation with six degrees of freedom is favourable for $N_{11}$. With a further four for the probe vector $\vec{t}$ and the probe radius, ten degrees of freedom are then obtained for the calibrating calculation. These can be calculated by best-fit calculation (minimizing the sum of the squares of the errors). For this purpose, along with the aforementioned equation in a correspondingly simplified form, the sphere function is also required. The following simplifications are therefore obtained for the calibration with the sphere triplet:

- the deformation of the measuring tool 10 is calibrated, wherein only the displacement by a force is taken into account (submatrix $N_{11}$);
- $N_{11}$ should be calculated with six degrees of freedom (enforced symmetry);
- the measuring tool 10 comprises a probe sphere as the probe body 28;
- the measuring force that is exerted on the measuring tool 10 during the calibration can be captured by a force measuring device and read out sufficiently synchronously with the items of position information;
- during the measurement, the test sphere is kept in the sphere triplet (the measuring force therefore always points in the direction of the sphere triplet);
- n measuring points with different measuring forces, positions and orientations are recorded;
- the radius r of the probe sphere is known or is ascertained in a subsequent step.

Under these considerations, the following target function is obtained with the aid of the aforementioned equation and the ideas mentioned $$\sum_{i=1}^{n} \left[ (\vec{p}_{s,i} + M_{s,i} * (\vec{t_{N1}} + N_{11} * \vec{f_i}) - \vec{p}_K) \right]^2 \rightarrow \text{Min.} \quad (17)$$

Apart from the components already known, this function also contains the position of the sphere triplet $\vec{p}_K$, which is likewise sought with three degrees of freedom in each case.

Alternatively, it is also possible to use for the calibration with a sphere triplet 32 a test sphere 34, as is often used for such calibrations in measurement technology. Such test spheres, which are usually referred to in coordinate measurement technology as calibration spheres, have an exactly known diameter (referred to here as 2R). Also in the case of this calibration variant with the test sphere 34, the measuring tool 10 is pivoted during the calibration, wherein the contact between the probe body 28 and the test sphere 34 is permanently maintained and the force exerted on the test sphere 34 is varied (see FIG. 7). In this case, the calculation takes place in a similar manner to that already explained above with respect to the first calibration variant illustrated in FIG. 6. The aforementioned formula can also be used here, in which case the position vector p of the probe body 28 is not constant. This results in one more degree of freedom. The following target function therefore results:

$$\sum_{i=1}^{n} \left[ (\vec{p}_{s,i} + M_{s,i} * (\vec{t_{N1}} + N_{11} * \vec{f_i}) - \vec{p}_K) - (R + r) \right]^2 \rightarrow \text{Min.} \quad (18)$$

where R is the radius of the calibration sphere 34 and r is the radius of the probe body 28.

For the sake of completeness, finally a possibility of calibrating the camera system 12 and the evaluation and control unit 14 should also be explained briefly below based on a possible example. For example, a camera system 12 having two cameras is used. A marker consisting of nine circular marker elements, which are arranged with a known spacing on a square grid and have additional identification features for distinguishing three discrete circles (for example colours: blue, red, green) is used as the marker 24. The first circle defines the origin of the marker coordinate system (position $\vec{p}_s$, see equation (4) above). The direction of the matrix $M_s$ results from the other two markings, e.g. the direction for matrix MS x axis from the direction from circle 1 to circle 2. In the simplest approach, the cameras are described using a so-called pinhole model. Such a model and an implementation are described in http://docs.opencv.org/2.4/modules/calib3d/doc/camera_calibration_and_3 d_reconstruction.html. An intrinsic camera calibration is initially carried out for each camera individually. In this case, at least the focal length, generally a camera matrix, is determined. A calibration object—a plate having regularly arranged features with a known distance—is used for this purpose. Images of this calibration object are captured at different distances, angles and orientations. So-called extrinsic calibration is then carried out, in which the location of the cameras relative to one another (angle, distance) is determined. According to this procedure, this stereo camera system can, in principle, calculate a 3D image from any simultaneously recorded image pair with sufficient image overlap and any image content. The so-called "block-matching algorithm" is usually used for this purpose. This calculates a so-called "disparity map". In this case, disparity means: size of the shift between the two camera images. A large shift means a large distance and a small shift means a small distance. The result of the extrinsic and intrinsic calibration can be used to calculate the distance in metric units therefrom. If the markers are circular, as assumed here, they initially appear in both images as ellipses. The image pairs can therefore be searched for these ellipses using known algorithms. In the aforementioned example with 9 marker elements, 9 position pairs for the two images are therefore obtained. The disparity and therefore the 3D position of each circle centre can therefore be calculated. A coordinate system can be clearly defined by marking 3 of the marker elements.

It goes without saying that the aforementioned calibration is preferably carried out only once prior to the actual measurement of the workpiece 20.

What is claimed is:
1. Measuring system comprising:
a measuring tool that comprises a probe body and an optical marker;
a camera for recording image data of the measuring tool; and
an evaluation and control unit that is configured to evaluate the image data captured by the camera and to determine spatial position coordinates of the optical marker based on the image data, wherein:

the evaluation and control unit is configured to calculate a deformation of the measuring tool due to external mechanical loading acting on the measuring tool, and to determine spatial position coordinates of the probe body based on the spatial position coordinates of the optical marker and the calculated deformation, the evaluation and control unit is configured to calculate the deformation of the measuring tool based on a mechanical substitute model, in which the measuring tool is modelled as a mechanical system that comprises at least two rigid bodies and a first elastic node that connects the two rigid bodies to one another, the deformation is modelled in the mechanical substitute model as a translation and/or rotation of the two rigid bodies in relation to one another and is calculated using the following equation:

$$\vec{u} = N * \vec{b},$$

where $\vec{u}$ is a deformation vector which describes the deformation of the measuring tool in vector notation, where $\vec{b}$ describes the external mechanical loading in vector notation, where N is a compliance matrix that describes compliance properties of the first elastic node as a result of the external mechanical loading, and the spatial position coordinates of the probe body are calculated uisng the following equation:

$$\vec{p} = \vec{p}_s + M_s * \left( \vec{p_{N1}} + f(\vec{u}, \vec{t_{N1}}) \right)$$

with $\vec{u} = \begin{pmatrix} v_{0x} \\ v_{0y} \\ v_{0z} \\ \delta_{rx} \\ \delta_{ry} \\ \delta_{rz} \end{pmatrix}$, where $$f(\vec{u}, \vec{t_{N1}}) = R_z(\delta_{rz}) * R_y(\delta_{ry}) * R_x(\delta_{rx}) * \vec{t_{N1}} + \begin{pmatrix} v_{0x} \\ v_{0y} \\ v_{0z} \end{pmatrix},$$

where $\vec{p}$ describes the spatial position coordinates of the probe body in vector notation in a fixed inertial system, where $\vec{p}_s$ describes the spatial position coordinates of the optical marker in vector notation in the fixed inertial system, where $M_s$ is a transformation matrix for a transformation of vectors from a body-fixed coordinate system that is fixed with respect to the measuring tool, into the fixed inertial system, where $\vec{p}_{N1}$ describes spatial position coordinates of the first elastic node in vector notation in the body-fixed coordinate system, where $\vec{t}_{N1}$ describes a vector of the first elastic node in relation to the probe body in the body-fixed coordinate system, where $v_{0x}$, $v_{0y}$, $v_{0z}$ are translation components of the deformation vector $\vec{u}$ and $\delta_{rx}$, $\delta_{ry}$, $\delta_{rz}$ are rotation components of the deformation vector $\vec{u}$, and where $R_x$, $R_y$, $R_z$ describe rotation matrices for a rotation of the rotation components $\delta_{rx}$, $\delta_{ry}$, $\delta_{rz}$ in Euclidean space.

2. The measuring system of claim 1, wherein:

the measuring tool comprises a rod that connects the optical marker and the probe body with each other, and calculating the deformation of the measuring tool due to external mechanical loading acting on the measuring tool includes calculating a deformation of the rod due to external mechanical loading acting on the measuring tool.

3. Measuring system according to claim 2, wherein the evaluation and control unit is configured to calculate the deformation of the rod based on a simplified mechanical substitute model, in which the rod is modelled as a mechanical system that comprises at least two rigid bodies and a first elastic node that connects the two rigid bodies to one another.

4. Measuring system according to claim 3, wherein the first elastic node is placed in the mechanical substitute model locally in between the probe body and the optical marker.

5. The measuring system of claim 1, wherein the first elastic node is placed in the mechanical substitute model locally in between the probe body and the optical marker.

6. The measuring system of claim 1, wherein the external mechanical loading acting on the measuring tool comprises a weight of the measuring tool, a force of inertia acting on the measuring tool and/or a contact force acting on the probe body.

7. The measuring system of claim 1, wherein the measuring system comprises a force measuring device for measuring the external mechanical loading acting on the measuring tool.

8. The measuring system of claim 7, wherein the force measuring device comprises a force sensor that is integrated in the measuring tool or arranged on the measuring tool.

9. The measuring system of claim 7, wherein:

the camera and the evaluation and control unit are parts of the force measuring device, and the evaluation and control unit is configured to calculate the external mechanical loading acting on the measuring tool based on the image data recorded by the camera.

10. The measuring system of claim 1, wherein the optical marker comprises three optical marker elements arranged on the measuring tool.

11. The measuring system of claim 10, wherein:

the measuring tool is modelled in the mechanical substitute model as a mechanical system that comprises a first rigid body, a second rigid body and a third rigid body as well as a first elastic node and a second elastic node, the first elastic node connects the first rigid body and the second rigid body to one another, the second elastic node connects the second rigid body and the third rigid body to one another, a first of the three optical marker elements is modelled as part of the first rigid body, a second of the three optical marker elements is modelled as part of the second rigid body, and the probe body is modelled as part of the third rigid body.

12. The measuring system of claim 10, wherein the three optical marker elements are passive, optical marker elements which in an undeformed state of the measuring tool are arranged in one common plane.

13. The measuring system of to claim 1, wherein the probe body is designed as a probe sphere or probe tip.

14. A measurement method comprising:
recording image data of a measuring tool, wherein the measuring tool comprises a probe body and an optical marker;
evaluating the recorded image data;
determining spatial position coordinates of the optical marker based on the evaluated image data;
calculating a deformation of the measuring tool due to external mechanical loading acting on the measuring tool, wherein:
the deformation is calculated based on a mechanical substitute model, in which the measuring tool is modelled as a mechanical system that comprises at least two rigid bodies and a first elastic node that connects the two rigid bodies to one another, and
the deformation is modelled in the mechanical substitute model as a translation and/or rotation of the two rigid bodies in relation to one another and is calculated using the following equation:

$$\vec{u} = N * \vec{b},$$

where $\vec{u}$ is a deformation vector that describes the deformation of the measuring tool in vector notation,
where $\vec{b}$ describes the external mechanical loading in vector notation, and
where N is a compliance matrix that describes compliance properties of the first elastic node as a result of the external mechanical loading; and
determining spatial position coordinates of the probe body based on the spatial position coordinates of the optical marker and the calculated deformation,
wherein the spatial position coordinates of the probe body are calculated by means of the following equation:

$$\vec{p} = \vec{p}_s + M_s * (\overrightarrow{p_{N1}} + f(\vec{u}, \overrightarrow{t_{N1}})) \text{ with } \vec{u} = \begin{pmatrix} v_{0x} \\ v_{0y} \\ v_{0z} \\ \delta_{rx} \\ \delta_{ry} \\ \delta_{rz} \end{pmatrix},$$

$$\text{where } f(\vec{u}, \overrightarrow{t_{N1}}) = R_z(\delta_{rz}) * R_y(\delta_{ry}) * R_x(\delta_{rx}) * \overrightarrow{t_{N1}} + \begin{pmatrix} v_{0x} \\ v_{0y} \\ v_{0z} \end{pmatrix},$$

where $\vec{p}$ describes the spatial position coordinates of the probe body in vector notation in a fixed inertial system,
where $\vec{p}_s$ describes the spatial position coordinates of the optical marker in vector notation in the fixed inertial system,
where $M_s$ is a transformation matrix for a transformation of vectors from a body-fixed coordinate system, which is fixed with respect to the measuring tool, into the fixed inertial system, where $\overrightarrow{p_{N1}}$ describes spatial position coordinates of the first elastic node in vector notation in the body-fixed coordinate system, where $\overrightarrow{t_{N1}}$ describes a vector of the first elastic node in relation to the probe body in the body-fixed coordinate system,
where $v_{0x}$, $v_{0y}$, $v_{0z}$ are translation components of the deformation vector $\vec{u}$ and $\delta_{rx}$, $\delta_{ry}$, $\delta_{rz}$ are rotation components of the deformation vector $\vec{u}$, and
where $R_x$, $R_y$, $R_z$ describe rotation matrices for a rotation of the rotation components $\delta_{rx}$, $\delta_{ry}$, $\delta_{rz}$ in Euclidean space.

15. A non-transitory computer readable storage medium encoded with a computer program that, when executed by a computer for controlling a measuring system including (i) a measuring tool having a probe body and an optical marker, and (ii) a camera for recording image data of the measuring tool, causes the computer to perform steps comprising:
evaluating the image data of the measuring tool;
determining spatial position coordinates of the optical marker based on the evaluated image data;
calculating a deformation of the measuring tool due to external mechanical loading acting on the measuring tool, wherein:
the deformation is calculated based on a mechanical substitute model, in which the measuring tool is modelled as a mechanical system that comprises at least two rigid bodies and a first elastic node that connects the two rigid bodies to one another, and
the deformation is modelled in the mechanical substitute model as a translation and/or rotation of the two rigid bodies in relation to one another and is calculated using the following equation:

$$\vec{u} = N * \vec{b},$$

where $\vec{u}$ is a deformation vector that describes the deformation of the measuring tool in vector notation,
where $\vec{b}$ describes the external mechanical loading in vector notation, and
where N is a compliance matrix that describes compliance properties of the first elastic node as a result of the external mechanical loading; and
determining spatial position coordinates of the probe body based on the spatial position coordinates of the optical marker and the calculated deformation, wherein the spatial position coordinates of the probe body are calculated using the following equation:

$$\vec{p} = \vec{p}_s + M_s * (\overrightarrow{p_{N1}} + f(\vec{u}, \overrightarrow{t_{N1}})) \text{ with } \vec{u} = \begin{pmatrix} v_{0x} \\ v_{0y} \\ v_{0z} \\ \delta_{rx} \\ \delta_{ry} \\ \delta_{rz} \end{pmatrix},$$

$$\text{where } f(\vec{u}, \overrightarrow{t_{N1}}) = R_z(\delta_{rz}) * R_y(\delta_{ry}) * R_x(\delta_{rx}) * \overrightarrow{t_{N1}} + \begin{pmatrix} v_{0x} \\ v_{0y} \\ v_{0z} \end{pmatrix},$$

where $\vec{p}$ describes the spatial position coordinates of the probe body in vector notation in a fixed inertial system, where $\vec{p}_s$ describes the spatial position coordinates of the optical marker in vector notation in the fixed inertial system, where $M_s$ is a transformation matrix for a transformation of vectors from a body-fixed coordinate system that is fixed with respect to the measuring tool, into the fixed inertial system, where $\vec{p}_{N1}$ describes spatial position coordinates of the first elastic node in vector notation in the body-fixed coordinate system, where $\vec{t}_{N1}$ describes a vector of the first elastic node in relation to the probe body in the body-fixed coordinate system, where $v_{0x}$, $v_{0y}$, $v_{0z}$ are translation components of the deformation vector $\vec{u}$ and $\delta_{rx}$, $\delta_{ry}$, $\delta_{rz}$ are rotation components of the deformation vector $\vec{u}$, and where $R_x$, $R_y$, $R_z$ describe rotation matrices for a rotation of the rotation components $\delta_{rx}$, $\delta_{ry}$, $\delta_{rz}$ in Euclidean space.

\* \* \* \* \*

UNITED STATES PATENT AND TRADEMARK OFFICE
CERTIFICATE OF CORRECTION

PATENT NO. : 10,648,792 B2
APPLICATION NO. : 15/713787
DATED : May 12, 2020
INVENTOR(S) : Tobias Held It is certified that error appears in the above-identified patent and that said Letters Patent is hereby corrected as shown below:

In the Claims

| | |
|---|---|
| Claim 1, Column 18, Line 61 | "Measuring" should be --A measuring-- |
| Claim 1, Column 19, Line 24 | "which" should be --that-- |
| Claim 1, Column 19, Line 32 | "uisng" should be --using-- |
| Claim 3, Column 20, Line 16 | "Measuring" should be --The measuring-- |
| Claim 3, Column 20, Line 16 | "according to" should be --of-- |
| Claim 4, Column 20, Line 23 | "Measuring" should be --The measuring-- |
| Claim 4, Column 20, Line 23 | "according to" should be --of-- |
| Claim 12, Column 21, Line 1 | "which" should be --that,-- |
| Claim 12, Column 21, Line 1 | after "tool", insert --,-- |
| Claim 13, Column 21, Line 3 | after "of", delete "to" |
| Claim 14, Column 21, Line 39 | "by means of" should be --using-- |
| Claim 14, Column 21, Lines 63-64 | "system, which" should be --system that-- |
| Claim 14, Column 21, Line 65 | after "system,", insert --¶-- |

Signed and Sealed this
Nineteenth Day of January, 2021

Andrei Iancu
*Director of the United States Patent and Trademark Office*